United States Patent [19]

Butcher

[11] Patent Number: 5,734,849
[45] Date of Patent: Mar. 31, 1998

[54] DUAL BUS MEMORY TRANSACTIONS USING ADDRESS BUS FOR DATA TRANSFER

[75] Inventor: Lawrence L. Butcher, Mountain View, Calif.

[73] Assignee: Sun Microsystems, Inc., Mountain View, Calif.

[21] Appl. No.: 673,055

[22] Filed: Jul. 1, 1996

[51] Int. Cl.[6] ............................................. G06F 13/00
[52] U.S. Cl. .......................... 395/308; 395/281; 395/304; 711/154; 711/167
[58] Field of Search ............................ 711/154, 167; 395/281, 304, 306, 307, 308

[56] References Cited

U.S. PATENT DOCUMENTS

| | | | |
|---|---|---|---|
| 4,144,562 | 3/1979 | Cooper | 395/307 |
| 4,404,554 | 9/1983 | Tweedy, Jr. et al. | 345/25 |
| 4,443,864 | 4/1984 | McElroy | 395/307 |
| 4,991,170 | 2/1991 | Kem | 395/878 |
| 5,249,160 | 9/1993 | Wu et al. | 365/230.08 |

*Primary Examiner*—David L. Robertson
*Attorney, Agent, or Firm*—Blakely Sokoloff Taylor & Zafman

[57] ABSTRACT

During burst write transactions, a memory accepts data over an address bus after an address has been received. In order to accept data over the address bus, the memory temporarily stores the data received over the address bus in an internal data buffer. The internal data buffer then transfers the data to an array upon completion of the write transaction. During burst read transactions, the memory transmits data over the address bus during one of the four clock cycles after the address is received. In this way a burst write transaction is completed in three clock cycles instead of four. Burst read transactions are completed in four clock cycles instead of five.

18 Claims, 5 Drawing Sheets

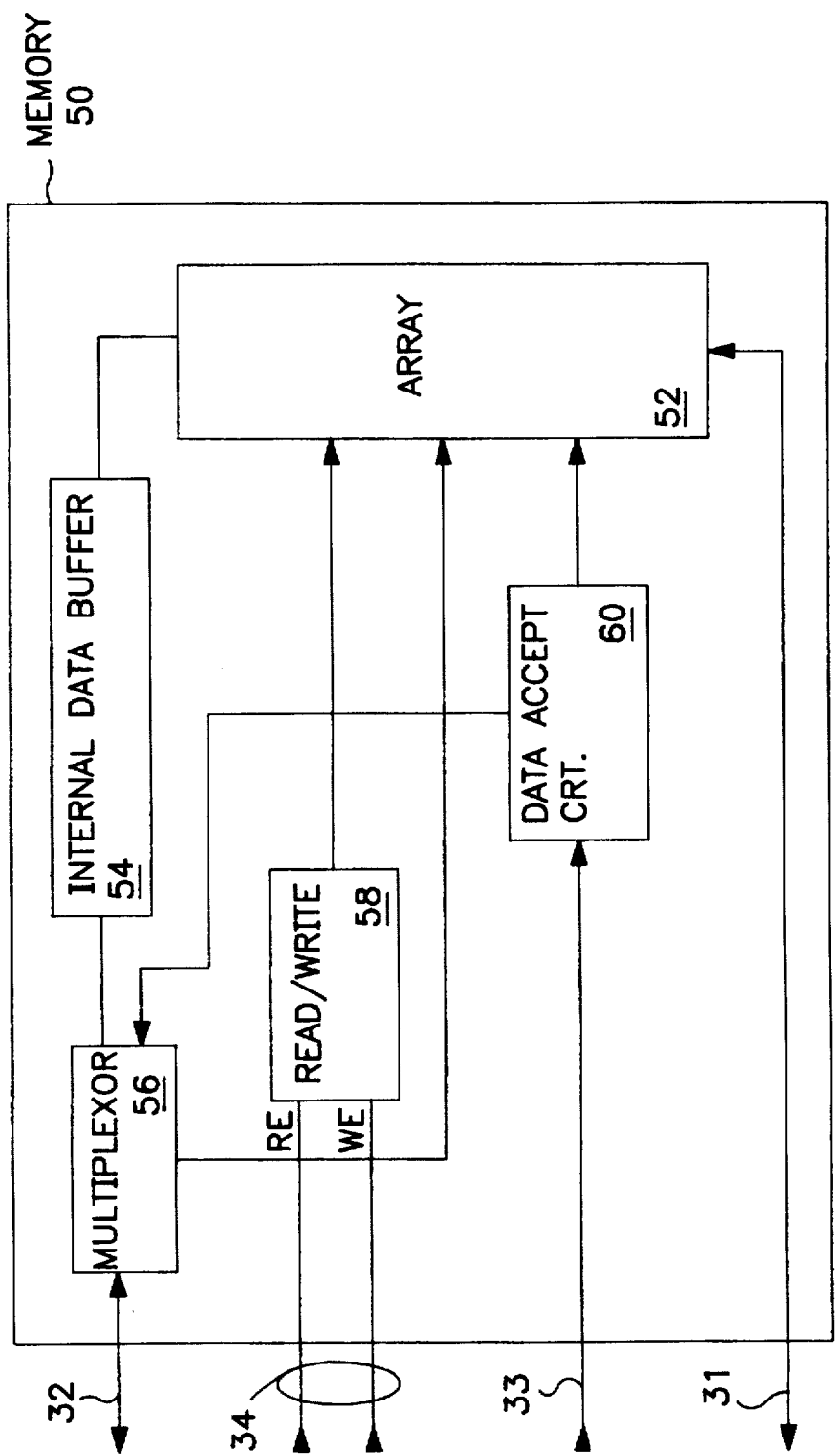

DUAL BUS MEMORY TRANSACTIONS USING ADDRESS BUS FOR DATA TRANSFER

BACKGROUND OF THE INVENTION

1. Field of the Invention

This invention relates generally to digital data processing systems and, more specifically to a method and apparatus for increasing the speed of burst memory transactions within a computer system.

2. Background Information

As the computer revolution has progressed, the quest of computer hardware developers has been to develop computer systems exhibiting more processing power and faster performance. In order to increase the speed of computer systems, developers place great emphasis in efficiently using the available clock cycles of the central processing unit (CPU) to execute the necessary instructions.

Pipeline burst static memory units (memory) are integrated into the majority of the CPU boards that are now manufactured. Data is stored to and retrieved from addressable storage locations within the memory, and transferred to and from the CPU via a data bus. The memory also communicates with the CPU over an address bus, which is used by the CPU to access the storage locations of the memory.

For read transactions, a read address is transferred from the CPU to the memory over the address bus. Later, corresponding data is transferred from the memory to the CPU. A burst read transaction uses one clock cycle to transfer an address packet from the CPU to the memory; and the next four clock cycles to transfer the corresponding data packets from the memory to the CPU. FIG. 1a illustrates a clock diagram of a burst read transaction.

For write transactions, a write address is transferred from the CPU to the memory over the address bus, while data is transferred from the CPU to the memory over the data bus at the same time. A burst write transaction uses one clock cycle to transfer both the address packet and the first data packet from the CPU to the memory, and uses the next three clock cycles to transfer the remaining data packets. FIG. 1b illustrates a clock diagram of a burst write transaction.

While a burst transfer is in progress, the address bus is unused for much of the duration of the transaction. During burst write transactions the address bus is unused for three clock cycles while data is being transferred; and on burst read transactions, the address bus is unused for four clock cycles while data is being transferred. Thus data processing systems using these memory access schemes are not making efficient use of the address bus during burst memory transactions.

SUMMARY OF THE INVENTION

According to a first embodiment, a method for reducing the total number of clock cycles required to carry out burst memory transactions is described. During burst write transactions, a memory accepts data over an address bus during one of the three clock cycles after an address is received. In order to accept data over the address bus, the memory temporarily stores the data received over the address bus in an internal data buffer before transferring the data to an array upon completion of the write transaction. During burst read transactions, the memory transmits data over the address bus during one of the four clock cycles after the address is received. A burst write transaction is thus completed in three clock cycles instead of four. Burst read transactions are completed in four clock cycles instead of five.

BRIEF DESCRIPTION OF THE DRAWINGS

FIG. 4 illustrates a memory device configured in accordance with the present invention.

DETAILED DESCRIPTION

The present invention provides a method and apparatus for efficiently executing burst memory transactions within a digital data processing system. In the following description, numerous specific details are set forth to provide a thorough understanding of the present invention. It will be appreciated, however, by one skilled in the art that the present invention may be practiced in a more general application where such advantages provided by this invention are desired.

Figure 1A:
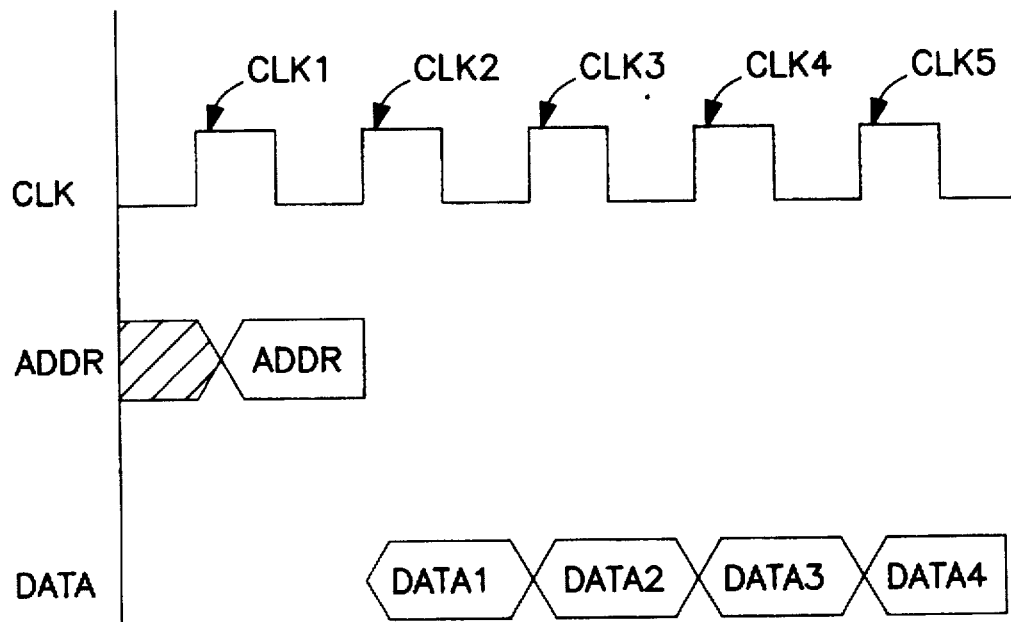
FIG. 1a illustrates a clock diagram for a burst read transaction in accordance with the prior art.

Referring to FIG. 1a, a clock diagram of a burst read transaction for a data processing system of the prior art is shown. An address packet (ADDR) is transmitted on a first clock cycle (CLK1), while corresponding data packets (DATA1, DATA2, DATA3, DATA4) are transmitted on each successive clock cycle (CLK2, CLK3, CLK4, CLK5) until the burst transaction is completed. Typically four data packets are transmitted during such a burst.

Figure 1B:
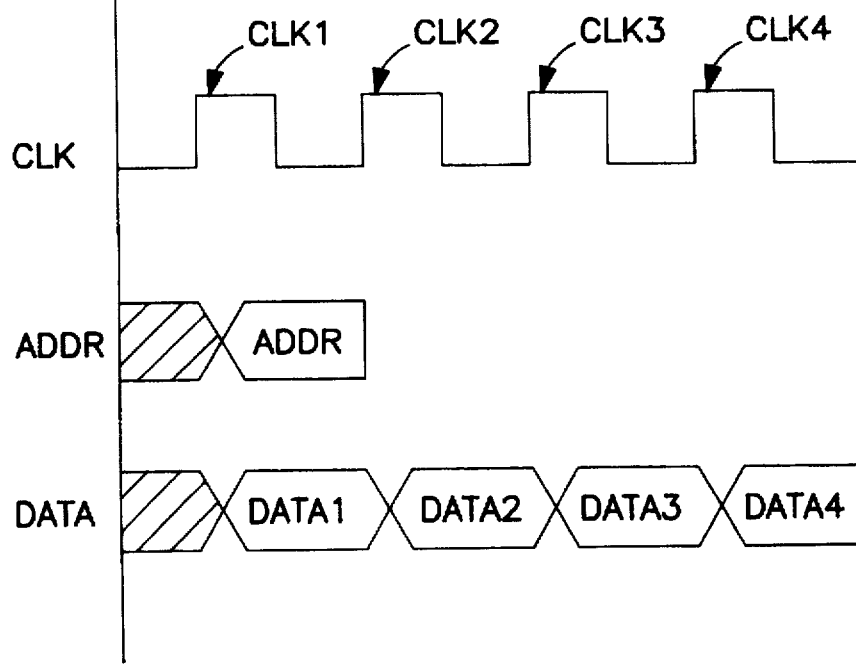
FIG. 1b illustrates a clock diagram for a burst write transaction in accordance with the prior art.

Referring to FIG. 1b, a clock diagram of a burst write transaction for a data processing system of the prior art is shown. An address packet (ADDR) is transmitted on a first clock cycle (CLK1), while a corresponding data packet (DATA1) is also transmitted on CLK1. Also, further corresponding data packets (DATA2, DATA3, DATA4) are transmitted on each successive clock cycle (CLK2, CLK3, CLK4) until the burst transaction is completed.

It is evident from FIGS. 1a and 1b that the address bus is unused for at least four clock cycles during burst read transactions, and three clock cycles during burst write transactions. Consequently, data processing systems using these methods fail to operate at maximum efficiency during burst transactions.

Figure 2:
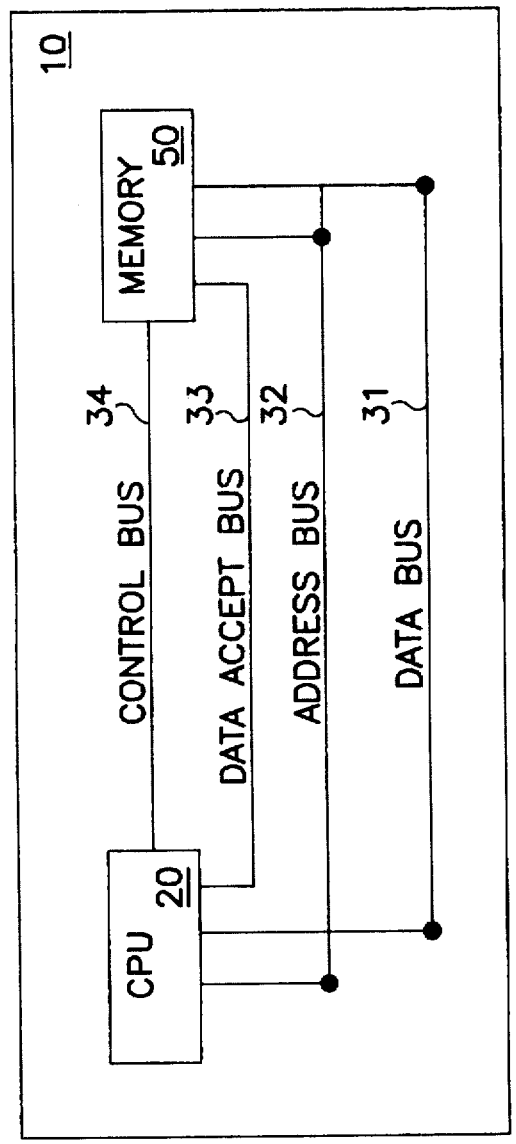
FIG. 2 shows a data processing unit configured in accordance with the present invention.

Referring to FIG. 2, a block diagram of an exemplary data processing system 10 which incorporates the apparatus and methods of the present invention is shown. The data processing system 10 includes a central processing unit 20 (CPU) and a memory 50. The CPU 20 and the memory 50 are coupled to one another by a data bus 31, an address bus 32, a data accept bus 33, and a control bus 34. During a typical data transaction (e.g., a read or write), the CPU 20 transmits a control signal over the control bus 34 to the memory 50 on a first clock cycle in order to indicate the direction of the transfer, read or write. At the same time, the CPU 20 also transmits an address packet to the memory 50 over the address bus 32 in order to indicate which addressable storage location in memory 50 is to be accessed.

Also on the first clock, the CPU 20 transmits a data accept signal to the memory 50 over the data accept bus 33 in order to indicate to the memory 50 whether or not the address bus 32 is to be used to transfer data. During a burst read transfer, data is transferred from the memory 50 to the CPU 20 over the data bus 31 for three clock cycles following the receipt of an address. In addition, data is transferred over the address bus 32 for one clock cycle following the receipt of the address. During a burst write transfer, data is transferred from the CPU 20 to the memory 50 over the data bus 31 commenting on the first clock cycle, and continuing for the next two clock cycles. Data is also transferred over the address bus 32 during one of these next clock cycles.

Figure 3A:
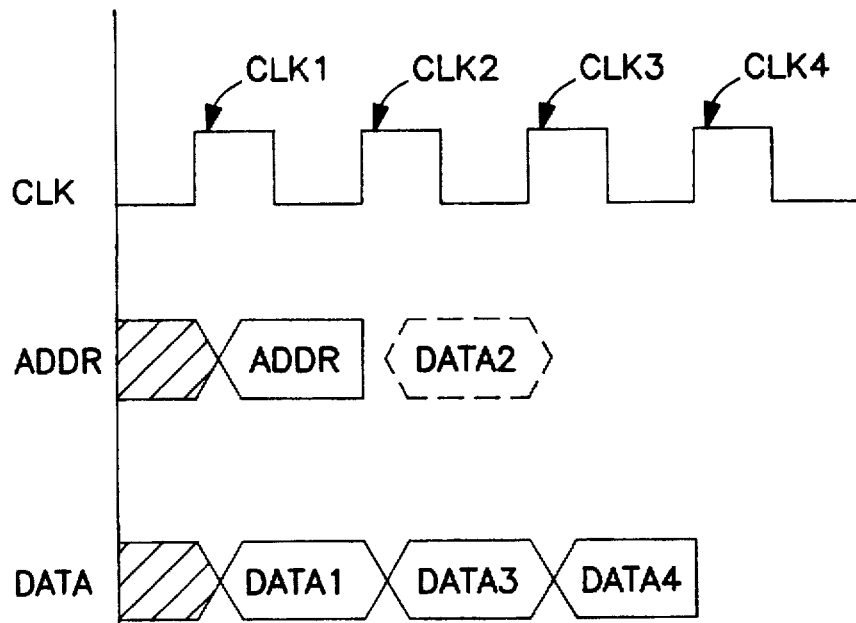
FIG. 3a illustrates a clock diagram for a burst write transaction in accordance with the present invention.

The manners in which these burst memory transactions are accomplished is further discussed with reference to FIGS. 3a and 3b. FIG. 3a shows a clock diagram of a burst write transaction for the data processing system 10. An address packet (ADDR) is transmitted from the CPU 20 to the memory 50 over the address bus 32 on a first clock cycle (CLK1). A corresponding first data packet (DATA1) is also transmitted from the CPU 20 to the memory 50 on CLK1 over the data bus 31. On the next clock cycle (CLK2) data packets (DATA2 and DATA3) are transmitted over the address bus 32 and the data bus 31, respectively. Finally the last data packet (DATA4) is transmitted over the data bus 31 on CLK3. It is apparent by comparing the timing charts of FIGS. 3a and 1b that a burst write transaction completed in accordance with the present invention has saved one clock cycle over the methods of the prior art. Thus, data transfers within data processing system 10 have been made more efficient.

Figure 3B:
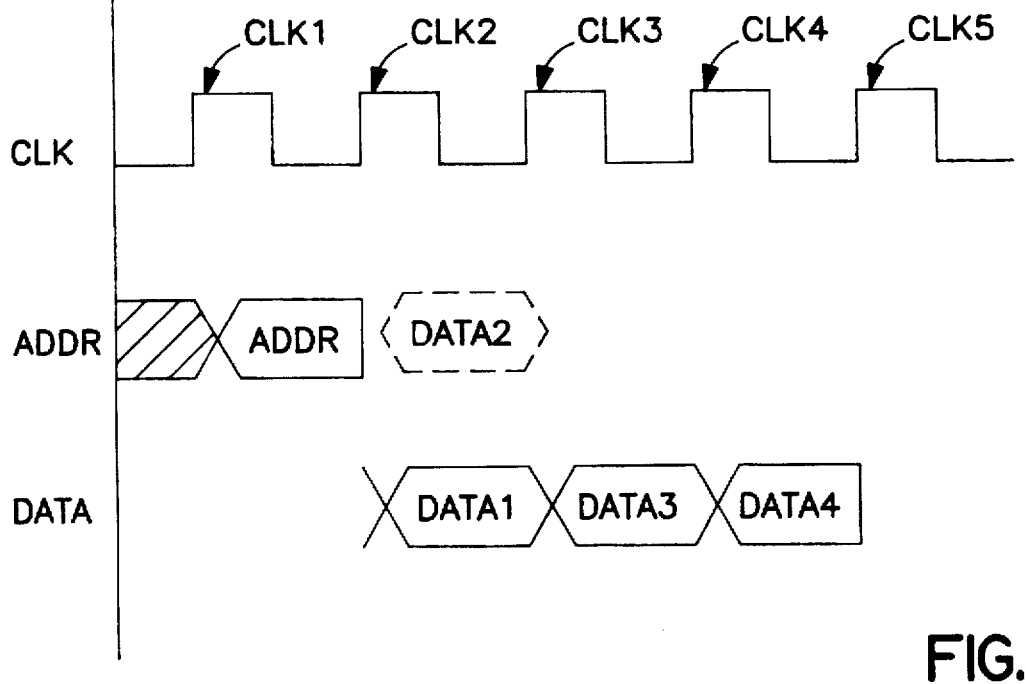
FIG. 3b illustrates a clock diagram for a burst read transaction in accordance with the present invention.

Referring now to FIG. 3b, a clock diagram of a burst read transaction for the data processing system 10 is shown. An address packet (ADDR) is transmitted from the CPU 20 to the memory 50 over the address bus 32 on a first clock cycle (CLK1). Corresponding data packets (DATA1, DATA3, and DATA4) are transmitted from the memory 50 to the CPU 20 over the data bus 31 on the subsequent three clock cycles (CLK2, CLK3, and CLK4), respectively. Also, a corresponding data packet (DATA2) is transmitted from the memory 50 to the CPU 20 over the address bus 32 during CLK2. Again, a comparison of FIGS. 3b and 1a reveals a savings of one clock cycle during a burst read transaction using the methods of the present invention. It will be appreciated that an alternative embodiment may have the DATA4 packet transmitted over the address bus at the same time that the DATA3 packet is transmitted over the data bus.

In order to carry out memory transactions according to the above described methods, certain improvements to a standard memory device are required. FIG. 4 illustrates memory 50, configured to allow memory transactions in accordance with the present invention. The memory 50 includes an array 52, an internal data buffer 54, a multiplexer 56, a read/write control circuit 58, and a data accept circuit 60. As shown, array 52 includes the necessary address decode logic. During a burst write transaction, a write control signal WE is transmitted over the control bus 34 from the CPU 20 to the read/write control circuit 58 on the first clock cycle. The read/write control circuit 58 recognizes the control signal WE and, in response, transmits a signal to the array 52 indicating a write transaction. At the same time, CPU 20 also transmits a data accept signal to the data accept circuit 60 over the data accept bus 33 in order to indicate that data will be transmitted from the CPU 20 to the memory 50 over the address bus 32 on the next clock cycle. Finally, as illustrated in FIG. 3a, the CPU 20 transmits an address packet over the address bus 32 and a first data packet over the data bus 31 to the memory 50 on the first clock cycle.

The data accept signal transmitted by CPU 20 over the data accept bus 33 is a command for the memory 50 to accept data over the address bus 32 on the following clock cycle. In response, the data accept circuit 60 signals the multiplexer 56 to couple the address bus 32 to the internal data buffer 54. Data accept circuit 60 also signals the array 52 that data will be received over the address bus. Data is transmitted from the CPU 20 over the address bus 32 during the next clock cycle (CLK2 in FIG. 3a) and stored in the internal data buffer 54. Later, the data stored in the internal data buffer 54 is transferred to the array 52 into a storage location corresponding to the burst address. After the data is stored in the internal data buffer 54, data accept circuit 60 signals the multiplexer 56 to couple the address bus 32 to the array 52 in preparation for the next transaction. Data received at the memory 50 from the CPU 20 which was transmitted over the data bus 31 is stored in array 52 at locations corresponding to the selected address. Of course, array 52 is aware that a data packet was transmitted over the address bus and allocates storage locations accordingly.

If the data accept signal were not asserted by the CPU 20, e.g., if memory 50 were being used with a processor that was incapable of such operation, this would indicate that data will not be transmitted over the address bus 32. In such a case, data is transferred from the CPU 20 to the memory 50 over the data bus 31 only. Such a transaction follows the methods of the prior art, illustrated in FIG. 1b. Thus, the presence of data accept circuit 60 allows memory 50 to be used with processors configured to operate in accordance with the prior art.

During a burst read transaction, a read control signal RE is transmitted over the control bus 34 from the CPU 20 to the read/write control circuit 58 on the first clock cycle. The read/write circuit 58 recognizes the control signal RE and, in response, transmits a signal to the array 52 indicating a read transaction. The CPU 20 also transmits a data accept signal to the data accept circuit 60 over the data accept bus 33 on the first clock cycle to indicate that data should be transmitted from the memory 50 to the CPU 20 over the address bus 32.

The address for the burst read is transmitted from CPU 20 to memory 50 during the first clock cycle, as illustrated in FIG. 3b. Because multiplexer 56 has been set to couple the address bus 32 to the array 52, the address is passed to array 52 where it is decoded. This allows array 52 to select the data to be transmitted in response to the read request.

In response to the data accept signal transmitted by CPU 20, data accept circuit 60 signals the array 52 to transfer one word of data to the internal data buffer 54. The data accept circuit 60 also signals the multiplexer 56 to couple the address bus 32 to the internal data buffer 54. Data is thereby transferred from the internal data buffer 54 to the CPU 20 over the address bus 32 on the next clock cycle. Three data packets are also transmitted from the array 52 to the CPU 20 over the data bus 31 for three successive clock cycles following the receipt of the address packet from the CPU 20. In this way, four data bytes are transferred in three clock cycles, as shown in FIG. 3b.

If the data accept signal were not asserted at the start of the burst read transaction, data would be transferred from the array 52 to the CPU 20 over the data bus 31 only, as illustrated in FIG. 1a.

Figure 5:
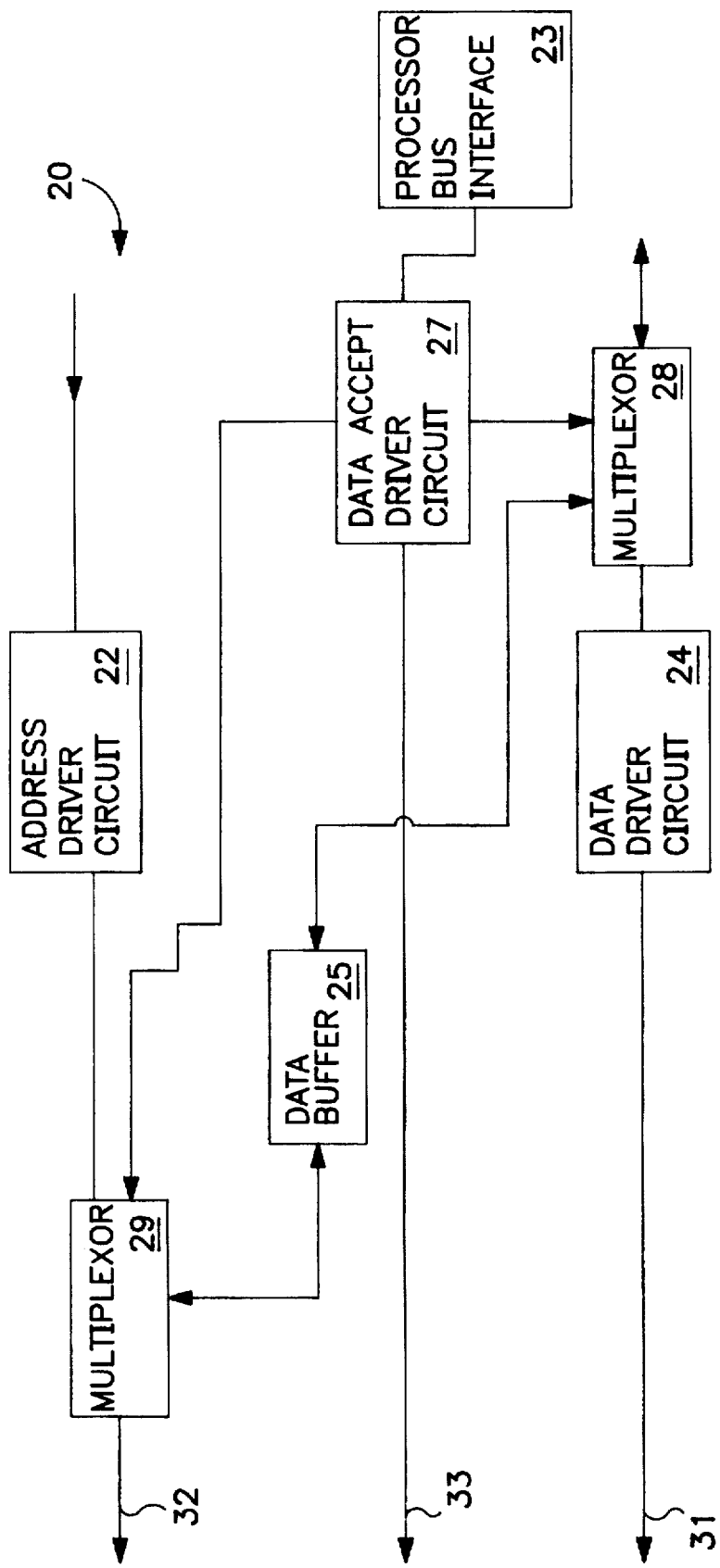
FIG. 5 illustrates a central processing unit (CPU) configured in accordance with the present invention.

Referring to FIG. 5, a block diagram of a CPU 20 configured in accordance with the present invention is shown. The CPU 20 includes an address driver circuit 22, a processor bus interface 23, a data driver circuit 24, a data buffer 25, a data accept driver circuit 27, and multiplexers 28 and 29. Both the address driver circuit 22 and the data driver circuit 24 have the capability of being tri-stated when CPU 20 is not driving the respective buses 31 and 32.

During a burst write transaction, the address driver circuit 22 receives address bits which are to be transmitted to the memory 50. At this time, the address driver circuit 22 is coupled to the address bus 32 via the multiplexer 29. Thus, on the first clock cycle, an address packet is transmitted from the CPU 20 to the memory 50. Also, the multiplexer 28 couples data driver circuit 24 to the data source of the CPU 20. Data driver circuit 24 transmits a data packet to the memory 50 over the data bus 31 on the first clock cycle. Finally, a data accept signal is transmitted from data accept driver circuit 27 to the memory 50 over the data accept bus 33 in order to indicate that data will be transmitted from the CPU 20 over the address bus 32 on the next clock cycle.

Data accept driver circuit 27 is signaled by the processor bus interface 23 after the first data packet is transmitted from data driver circuit 24. In response, the data accept driver circuit 27 signals the multiplexer 28 to couple the data buffer 25 to the data source of the CPU 20. Data accept driver circuit 27 also signals the multiplexer 29 to couple the address bus 32 to the data buffer 25. The second data packet is then transmitted from the data source of the CPU 20 to the data buffer 25. After the second data packet is transmitted from the data source of the CPU 20 to the data buffer 25, the signal from data accept driver 27 to multiplexer 28 is removed. Thus, multiplexer 28 again couples the data driver circuit 24 to the data source of the CPU 20. A third data packet is transmitted from the data source of the CPU 20 to the data driver circuit 24. Finally, the second data packet is transmitted from the data buffer 25 to the memory 50 over the address bus 32, while the third data packet is transmitted from data driver circuit 24 to the memory 50 over the data bus 31. Both the second data packet and the third data packet are transmitted on the second clock cycle.

After the second data packet is transmitted from the CPU 20 to the memory 50, the signal from the data accept driver circuit 27 to the multiplexer 29 is removed. This results in the address bus 32 being coupled to the address driver circuit 22. The address driver circuit 22 is in a high impedance state through the remainder of the burst transfer. After the third data packet is transmitted from the data driver circuit 24 to the memory 50, a fourth data packet is transmitted from the data source of the CPU 20 to the data driver circuit 24. The fourth data packet is transmitted from data driver circuit 24 to the memory 50 over the data bus 31 on the third clock cycle.

During a burst read transaction, an address packet is first transmitted from the address driver circuit 22 to the memory 50. In addition, the data accept driver circuit 27 transmits a signal over data accept bus 33 to alert memory 50 that data should be passed over address bus 32. Prior to the second clock cycle, address driver circuit 22 is tri-stated and data accept driver circuit 27 signals the multiplexer 29 to couple the address bus 32 to the data buffer 25.

The first data packet is received at the data driver circuit 24 from the memory 50 over the data bus 31 on the second clock cycle. The first data packet is transferred out of the data driver circuit 24 to the CPU 20. Also on the second clock cycle, the second data packet is received at the data buffer 25 from the memory 50 over the address bus 32. After the first data packet is transmitted from the data driver circuit 24 to the data source of the CPU 20, the processor bus interface 23 signals the data accept driver circuit 27. Processor bus interface 23 in turn signals the multiplexer 28 to couple the data buffer 25 to the CPU 20. The second data packet is transmitted from the data buffer 25 to the data source of the CPU 20. Once the second data packet is transmitted to the data source of the CPU 20, the signal from the data accept driver circuit 27 to the multiplexer 28 is removed; thus, data driver circuit 24 is again coupled to the data source of the CPU 20.

The third data packet is received at the data driver circuit 24 from the memory 50 over the data bus 31 on the third clock cycle. The third data packet is transmitted from the data driver circuit 24 to the data source of the CPU 20. On the fourth clock cycle, The fourth data packet is received at the data driver circuit 24 from the memory 50 over the data bus. The fourth data packet is transmitted from the data driver circuit 24 to the data source of the CPU 20.

Thus, a method and apparatus for efficiently executing burst memory transactions within a digital data processing system has been disclosed. Although the present invention has been described in terms of a preferred embodiment, it will be appreciated that various modifications and alterations might be made by those skilled in the art without departing from the spirit and scope of the invention. Therefore, the invention should be measured only in terms of the claims which follow.

What is claimed is:

1. In a computer system, a method of executing data transfers between a processor and a memory device comprising the steps of:

transmitting a write address from the processor to the memory device over a first bus on a first clock cycle while transmitting a first data word from the processor to the memory device over a second bus;

transmitting a second data word from the processor to the memory device over the first bus on a next clock cycle while transmitting a third data word from the processor to the memory device over the second bus.

2. The method of claim 1, further comprising the steps of:

transmitting a signal from the processor to the memory device over a third bus on said first clock cycle, the signal instructing the memory device to recognize the second data word received on the first bus as data to be stored in the memory device.

3. The method of claim 2, further comprising the steps of: the memory device storing the second data word received over the first bus and the third data word received over the second bus.

4. In a computer system, a method of executing data transfers between a processor and a memory device comprising the steps of:

transmitting a read address from the processor to the memory device over a first bus on a first clock cycle;

transmitting a first data word from the memory device to the processor over the first bus on the next clock cycle while transmitting a second data word from the memory device to the processor over a second bus.

5. The method of claim 4, further comprising the steps of:

transmitting a signal from the processor to the memory device over a third bus on said first clock cycle, the signal instructing the memory device to transmit the first data word to the processor on the first bus.

6. The method of claim 5, further comprising the steps of:

transmitting a third data word from the memory device to the processor over the first bus on a third clock cycle, while transmitting a fourth data word from the memory device to the processor over the second bus.

7. A computer system comprising:

a processor; and a memory coupled to the processor via a first bus and a second bus, wherein the processor and the memory are configured such that in a burst memory transaction a first address is transferred between the processor and the memory over the first bus, a first data packet is transferred between the processor and the memory over the second bus, and a second data packet is transferred between the processor and the memory over the first bus.

8. The computer system of claim 7, wherein the memory further comprises:

a memory array; and an internal data buffer coupled to the memory array, the internal data buffer for transferring data packets between the processor and the memory array over the first bus.

9. The computer system of claim 8, wherein the memory further comprises:

a multiplexer coupled to the internal data buffer and to the first bus, the multiplexer adaptable to provide a data path between the first bus and the internal data buffer so as to allow data to be transferred between the memory device and the processor over the first bus.

10. The computer system of claim 9, wherein the memory further comprises:

a data accept circuit coupled to the multiplexer and to the memory array, the data accept circuit for signaling the memory array to accept data received on the first bus, the data accept circuit for signaling the multiplexer to provide the data path between the first bus and the internal data buffer.

11. The computer system of claim 7, wherein the processor further comprises:

a data buffer coupled the first bus, the data buffer for storing data transferred between the processor and the memory via the first bus.

12. The computer system of claim 11, wherein the processor further comprises:

a multiplexer coupled to the data buffer; and a data accept driver circuit coupled to the multiplexer, the data accept driver circuit for signaling the multiplexer to configure a data path between the first bus and the data buffer so as to allow data to be transferred between the processor and the memory device over the first bus.

13. A computer system comprising:

a processor configured to transfer address information across a first bus, and configured to transfer data information across the first bus and a second bus;

a memory coupled to the processor, the memory configured to receive address information across the first bus, and configured to transfer data information across the first bus and the second bus.

14. The computer system of claim 13, wherein the memory further comprises:

a memory array; and an internal data buffer coupled to the memory array, the internal data buffer for transferring data between the processor and the memory array over the first bus.

15. The computer system of claim 14, wherein the memory further comprises:

a multiplexer coupled to the internal data buffer and to the first bus, the multiplexer for configuring a data path between the first bus and the internal data buffer so as to allow data to be transferred between the memory device and the processor over the first bus.

16. The computer system of claim 15, wherein the memory further comprises:

a data accept circuit coupled to the multiplexer and to the memory array, the data accept circuit for signaling the memory array to accept data received on the first bus.

17. The computer system of claim 13, wherein the processor further comprises:

a data buffer coupled to the first bus, file data buffer for transferring data between the processor and the memory via the first bus.

18. The computer system of claim 17, wherein the processor further comprises:

a multiplexer coupled to the data buffer; and a data accept driver circuit coupled to the multiplexer, the data accept driver circuit for signaling the multiplexer to configure a data path between the first bus and the buffer circuit so as to allow data to be transferred between the processor and the memory device over the first bus.

* * * * *